Sept. 11, 1951 C. W. EARP 2,567,194
ELECTRIC FREQUENCY DISCRIMINATOR
Filed Sept. 22, 1948
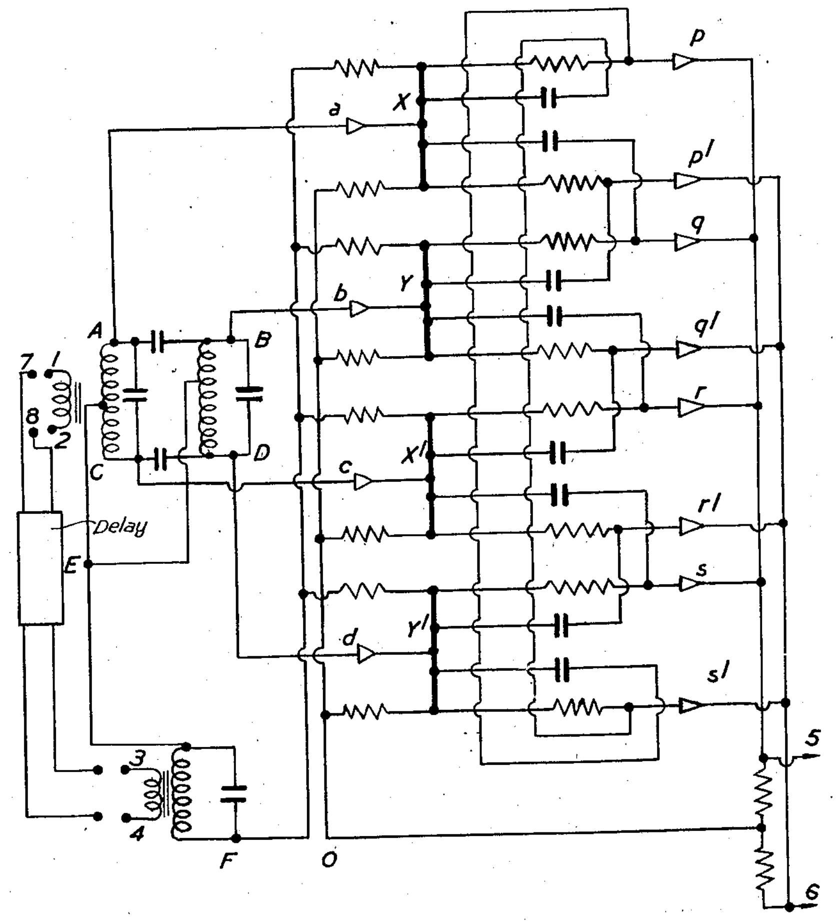
Inventor
CHARLES WILLIAM EARP
By [signature]
Attorney Patented Sept. 11, 1951

2,567,194

UNITED STATES PATENT OFFICE 2,567,194

ELECTRIC FREQUENCY DISCRIMINATOR

Charles William Earp, London, England, assignor to International Standard Electric Corporation, New York, N. Y., a corporation of Delaware Application September 22, 1948, Serial No. 50,650
In Great Britain September 29, 1947

6 Claims. (Cl. 250—27)

The present invention relates to electric frequency discriminators such as are used, for example, in the demodulating arrangements in frequency modulation carrier communication systems.

The principal object of the invention is to provide a sensitive discriminator which does not employ frequency selective networks, which have been hitherto used, to store the signal as a reference signal for comparison with the original signal. The invention in one form uses a fixed oscillation as the reference signal. The frequency of the reference signal is preferably adjusted to be exactly or approximately equal to the mean or unmodulated frequency of the signal, so that when modulated the signal produces both positive and negative frequency beats with the reference wave.

Ambiguity of sense of deviation is avoided however, by the use of phase-splitting networks, and corresponding detectors which produce polyphase beats, in which the relative phase of the beats yields information with regard to the sense of the frequency deviation of the signal.

Applications for the discriminator are found in frequency demodulation of frequency modulated or phase modulated signals in frequency shift telegraph system demodulators, and in frequency monitoring and automatic control systems. Another importance use is in demodulation of a phase-stepped signal such as that which is derived from commutation of the connections of a plurality of aerials to a signal receiver, as in radio direction finding systems of the type described in British Patent Specification No. 594,530.

According to a minor modification, the reference signal is obtained from the modulated wave itself by means of a delay network. By this means a signal of very large phase excursion is used to produce two signal vectors of reduced relative phase excursion, and these two signal vectors are applied to the discriminator circuit to yield an output wave according to the second time differential of the original phase modulation of the signal.

It will be clear that a frequency discriminator may be considered as producing an output voltage which represents in magnitude and sign the frequency deviation of the modulated carrier wave from the mean or unmodulated frequency. Besides its use as a demodulator, therefore, a discriminator may also be used as a frequency measuring device or monitor and in particular may be applied as a frequency monitor for checking the variation of the mean carrier frequency in a frequency modulation system. The discriminator according to the invention is well adapted to this application.

It may be added that although it is preferable for the reference wave to have the same frequency as the mean frequency of the carrier wave, this is not essential, and if the frequencies are not the same the only result is the introduction of a D. C. component with the demodulated wave, which is almost certain to be eliminated in the subsequent circuits.

According to one aspect, the invention provides an electric frequency discriminator for frequency monitoring a signal carrier wave, comprising means for applying the wave together with a reference carrier wave to a first plurality of rectifiers in a plurality of different phase relationships to yield a plurality of differently phased output waves corresponding to the amplitude envelope of the combined waves, means for combining the output waves in pairs, means for applying the combined pairs of output waves respectively to a second plurality of rectifiers, and means for deriving from a combination of all the rectified output waves, an output voltage representing the frequency deviation of the signal carrier wave.

According to another aspect, the invention provides an electric frequency discriminator for demodulating a frequency or phase modulated carrier wave, comprising a source of a reference carrier wave of the same mean frequency as the said carrier wave, means for deriving three or more differently phased waves from one of the carrier waves and for combining each of them with the other carrier wave, means for rectifying the combined waves to produce a plurality of differently phased output waves involving signal frequencies only, means for combining each output wave with a wave derived from a differently phased output wave, means for further rectifying the combined output waves, and means for deriving the modulating signal from a combination of all the rectified output waves.

Referring now to the accompanying figure, which shows a schematic circuit diagram of one embodiment of the invention, the signal is introduced to terminals 3, 4, and the fixed reference signal to terminals 1, 2. The signal and reference signal may be interchanged if desired.

The reference signal is split into three or more phases, and in the figure it is shown to be split into four phases at A, B, C, D, by means of coupled tuned circuits. These four outputs are each combined with the signal from terminals 3, 4 and the four combined signals are applied to rectifiers *a*, *b*, *c*, *d*. The load resistors for these rectifiers are connected respectively between terminals X, Y, X', and Y' and the terminal F and should preferably be shunted by the usual smoothing condensers (not shown). Resistors are connected respectively between the terminals X, Y, X' and Y' and a common point O which will always be at the mean potential of terminals X, Y, X', and Y'. Potentials developed across resistances OX, OY, OX', OY' are now applied to eight more rectifiers in the following manner: X is connected through resistors to rectifiers *p*, *p'*; Y is connected through resistors to rectifiers *q*, *q'*; X' is connected through resistors to rectifiers *r*, *r'*; Y' is connected through resistors to rectifiers *s*, *s'*.

Eight condensers make the following connections,

Xq, Yr, X's, Y'p and Xs', Yp', X'q', Y'r'

These condensers form differentiating circuits with the associated resistors. These differentiating circuits could take any other convenient form. Outputs from the eight detectors are connected in two sets of four to two output terminals 5, 6 the point O being connected to the common point of the two load resistors connected in series between terminals 5 and 6.

The connections described have the effect that the output at terminals 5, 6, varies in amplitude and sense according to the difference between the frequencies applied to terminals 1, 2 and 3, 4. In other words, the output from terminals 5, 6 represents the frequency modulation envelope of the signal.

The above result can be derived mathematically from a consideration of the mixing of the two signal trains in rectifiers *a*, *b*, *c*, *d* to yield outputs which contain a D. C. component, a fundamental, and all harmonics of the original modulation frequency, these corresponding to the amplitudes of the signal carrier wave components and the various sidebands of the signal.

The effect of combination of outputs in pairs through resistances and condensers is to combine them with a relative phase difference of 90°. It may be shown mathematically that this causes the various frequency component delivered by rectifiers *a*, *b*, *c*, *d* to beat together in rectifiers *p*, *q*, *r*, *s*, *p'*, *q'*, *r'*, *s'*, to yield beat frequency outputs of the fundamental frequency of signal modulation, all adding together in the same phase at terminals 5, 6.

A more practical explanation of operation of the discriminator is the following:

The effect of combining the signal potential difference at terminals EF with the four phase signal potential differences at terminals EA, EB, EC, ED is to produce resultant signal potential differences at terminals AF, BF, CF, DF, of unequal magnitudes. The rectified potentials across OX, OY, OX', OY' correspond to these combined signal potential magnitudes.

Let it be first assumed that the angular frequency of the reference signal is $\omega$ and that the angular frequency of the signal applied at terminals 3, 4, is also $\omega$. Then the potential EF can be represented as $k_1 \sin \omega t$, while the potentials EA, EB, EC, ED can be represented respectively as $$k_2 \sin (\omega t+\varphi)$$
$$k_2 \sin (\omega t+\varphi+\pi/2)$$
$$k_2 \sin (\omega t+\varphi+\pi)$$

and $$k_2 \sin (\omega t+\varphi+3\pi/2)$$

where $\varphi$ is the phase difference between the two signals applied respectively to terminals 1, 2 and 3, 4.

The potential applied to the rectifier *a* will accordingly be $k_1 \sin \omega t+k_2 \sin (\omega t+\varphi)$.

Assuming that $k_1$ is made large compared with $k_2$ so that the rectifier *a* operates substantially with a square law characteristic, then the current through the rectifier will be substantially proportional to $[k_1 \sin \omega t+k_2 \sin (\omega t+\varphi)]^2$. The rectified voltage applied between the terminal X and the mean potential terminal O will be derived from the product term $$2k_1k_2 \sin \omega t \sin (\omega t+\varphi)$$

and will be proportional to $k_1$, $k_2 \cos \varphi$. Similarly it is clear that the rectified voltages applied between the terminals Y, X' and Y' respectively and the point O will be proportional to $$k_1k_2 \cos (\varphi+\pi/2)=-k_1k_2 \sin \varphi$$
$$k_1k_2 \cos (\varphi+\pi)=-k_1k_2 \cos \varphi$$
$$k_1k_2 \cos (\varphi+3\pi/2)=+k_1k_2 \sin \varphi$$

These rectified voltages correspond to the envelopes of the combined waves applied to the rectifiers.

Let it now be supposed that the terminals X and X' be connected respectively to one pair of deflecting plates of a cathode ray oscillograph, and terminals Y and Y' to the other pair of deflecting plates. Then the spot on the screen will be deflected to a point whose polar co-ordinates are $2k_1k_2,\varphi$, with respect to the axis XOX'. Then it is clear that the length of the radius vector will be independent of $\varphi$.

Now if the angular frequency of the signal applied to terminals 3, 4 changes to a value of $\omega_1$ different from $\omega$, then the phase angle $\varphi$ will in effect vary at a constant rate proportional to the frequency difference $\omega_1-\omega$ and the spot on the screen of the oscillograph will describe a circle at a constant rate, either clockwise or anti-clockwise according to the sign of the frequency difference. It can be seen, therefore, that the frequency deviation (which represents the modulating signal amplitude) is proportional to $d\varphi/dt$. In order to recover the signal, therefore, it will be necessary to produce an output voltage at terminals 5 and 6 proportional to $d\varphi/dt$ and having the same sign.

It will be evident that the variations in $\varphi$ and $d\varphi/dt$ take place at relatively low signal frequencies since all high frequency components disappear after rectification.

Before proceeding to show how this is accomplished in the accompanying circuit, it will be useful to indicate in a qualitative manner how the ambiguity of sign is resolved, so that a clockwise rotation of the spot in the oscillograph source is converted into a positive output potential, and an anti-clockwise rotation into a negative output potential.

Suppose the spot is situated in the quadrant XOY, and is rotating in a clockwise direction, that is from Y towards X. Under these circumstances:

Potential OX is positive
Potential OY is positive
Potential OX' is negative
Potential OY' is negative
Rate of change of OX is positive
Rate of change of OY is negative
Rate of change of OX' is negative
Rate of change of OY' is positive Referring now to the figure, rectifiers $p$, $q$, $r$, $s$ are resistance coupled to X, Y, X', Y', and condensers coupled to Y', X, Y, X', respectively. Rectifier $p$ is therefore fed directly by potential OX, and by the differentiated potential OY'. In other words, the total input to the rectifier $p$ can be considered as potential OX plus a potential which represents the rate of change of OY'. Other rectifiers $q$, $r$, $s$ are supplied in similar manner with other combinations of direct and differentiated potentials.

The following table sets out the input potentials applied to the various rectifiers with the corresponding signs:

| | |
|---|---|
| $p$ OX and $d(\text{OY}')/dt$ | (+ and +) |
| $q$ OY and $d(\text{OX})/dt$ | (+ and +) |
| $r$ OX' and $d(\text{OY})/dt$ | (− and −) |
| $s$ OY' and $d(\text{OX}')/dt$ | (− and −) |
| $p'$ OX and $d(\text{OY})/dt$ | (+ and −) |
| $q'$ OY and $d(\text{OX}')/dt$ | (+ and −) |
| $r'$ OX' and $d(\text{OY}')/dt$ | (− and +) |
| $s'$ OY' and $d(\text{OX})/dt$ | (− and +) |

From the above table, it follows that rectifiers $p$ and $q$ conduct strongly, and that all others ($r$, $s$, $p'$, $q'$, $r'$, $s'$) conduct either not at all, or very slightly. Hence a positive potential is developed between terminals 5, 6.

If now the behaviour of rectifiers for other positions of the spot be examined, it will be found (as would be expected from the perfect symmetry of the circuit) that for clockwise rotation potential 5, 6 is positive and that for anticlockwise rotation, potential 5, 6, is negative.

Now, as already stated the rectifier $p$ is supplied with a potential proportional to potential OX together with a potential proportional to the differentiated potential OY', that is $$k_1k_2 \cos \varphi + d/dt.(k_1k_2 \sin \varphi)$$
$$= k_1k_2 \cos \varphi(1 + d\varphi/dt)$$

Similarly, the rectifiers $q$, $r$ and $s$ are supplied with potentials $$-k_1k_2 \sin \varphi(1 + d\varphi/dt)$$
$$-k_1k_2 \cos \varphi(1 + d\varphi/dt)$$

and $$+k_1k_2 \sin \varphi(1 + d\varphi/dt)$$

Assuming that the rectifiers are of the so-called square-law type, and since two of the above potentials will evidently be positive and the other two negative, the significant part of the rectified potential supplied to terminal 5 will be given by $$k_1^2k_2^2 \sin^2 \varphi(1 + d\varphi/dt)^2 + k_1^2k_2^2 \cos^2 \varphi(1 + d\varphi/dt)^2$$
$$= k_1^2k_2^2(1 + d\varphi/dt)^2$$

Considering terminal 6, the rectifier $p'$ is supplied with a potential proportional to potential OX together with a potential proportional to the differentiated potential OY, that is, $$k_1k_2 \cos \varphi + d/dt(-k_1k_2 \sin \varphi)$$
$$= k_1k_2 \cos \varphi(1 - d\varphi/dt)$$

and it will be evident that all the potentials relating to terminal 6 will be similar to those relating to terminal 5 except that the sign of $d\varphi/dt$ is changed.

Accordingly, the total potential applied to terminal 6 will be given by $k_1^2k_2^2(1 - d\varphi/dt)^2$. Thus the difference of potential between terminals 5 and 6 will evidently be proportional to $4k_1^2k_2^2 d\varphi/dt$, all other terms cancelling out. The output at terminals 5 and 6 is therefore proportional to $d\varphi/dt$ as desired, and the amplitude of the modulating signal will be recovered both in magnitude and sign.

The rectifiers shown in the circuit may take any suitable form, but diodes will probably be preferable particularly for rectifiers $a$, $b$, $c$, $d$, which have to deal with high frequencies.

The sensitivity of the discriminator for a given value of $d\varphi/dt$ evidently depends on the constant of the differentiating circuits. Hence the choice of large condensers in the differentiating circuits gives high sensitivity for low values of $d\varphi/dt$, and a corresponding overall discriminator characteristic which occupies a narrow frequency band.

According to a modified arrangement illustrated in the figure, the reference signal of constant frequency is not used, but a reference signal is derived from the modulated wave itself by means of a delay network. The signal is applied to terminals 7, 8 which are also connected to 1, 2 and through a delay network to terminals 3, 4. In this case the differential phase modulation between inputs 1, 2, and 3, 4 is the first time differential of the original signal phase modulation. Thus, the output from terminals 5, 6 represents the first differential of the frequency modulation of the signal or the second differential with regard to time, of the original phase modulation.

When the modulating signal is of a general character such as a speech signal occupying a particular frequency band, the delay introduced by the network should be small compared with the period of the highest frequency of the signal band. If the recovered signal is required in its original form an integrating circuit of a convenient type should be connected to terminals 5 and 6 in the case of frequency modulation, or two such integrating circuits in cascade in the case of phase modulation.

When the modulated wave is of a special character, for example in the system described in Patent Specification No. 594,530 in which the wave consists of a carrier frequency whose phase varies suddenly in steps at equal intervals of time, an advantage is gained if the delay introduced by the delay network shown in the figure is equal to the period between the changes in phase.

It should be added that the circuit arrangement of the figure could be modified without any change in the basic principle so that the reference signal is split into three, or other number of phases. The number of sets of rectifiers employed would be modified in accordance with the number of phases.

While the principles of the invention have been described above in connection with specific embodiments, and particular modifications thereof it is to be clearly understood that this description is made only by way of example and not as a limitation on the scope of the invention.

What is claimed is:

1. An electric frequency discriminator for frequency monitoring a signal carrier wave, comprising means for applying the wave together with a reference carrier wave to a first plurality of rectifiers in a plurality of different phase relationships to yield a plurality of differently phased output waves having an alternating current component corresponding to the amplitude envelope of the combined waves, means for combining the alternating current components of said output waves in pairs, means for applying the combined pairs of output waves respectively to a second plurality of rectifiers and means for deriving from a combination of all the rectified output waves, an output voltage representing the frequency deviation of the signal carrier wave.

2. An electric frequency discriminator for demodulating a frequency or phase modulated carrier wave comprising a source of a reference carrier wave, means for deriving three or more differently phased waves from one of the carrier waves, and for combining each of them with the other carrier wave, means for rectifying the combined waves to produce a plurality of differently phased output waves having alternating current components corresponding to the amplitude envelope of the combined waves, means for combining the alternating current components of each output wave with a wave derived from a differently phased output wave, means for further rectifying the combined output waves, and means for deriving the modulating signal from a combination of all the rectified output waves.

3. A discriminator according to claim 1 in which the signal and reference carrier waves have substantially the same frequency.

4. An electric frequency discriminator for demodulating a frequency or phase modulated carrier wave having a specified mean frequency, comprising a source of a reference wave having the said mean frequency, means for deriving from one of the said waves a series of three or more differently phased waves, means for combining the other wave with each of the said differently phased waves, means for rectifying each combined wave in order to produce a corresponding rectified voltage wave having alternating current components containing signal frequency components only, means for differentiating each rectified voltage wave, means for combining each rectified voltage wave with the differentiated rectified voltage wave derived from the adjacent leading phase and for further rectifying the combination in order to produce a corresponding leading rectified voltage wave, means for combining each rectified voltage wave with the differentiated rectified voltage wave derived from the adjacent lagging phase and for further rectifying the combination in order to produce a corresponding lagging rectified voltage wave, means for separately combining all the leading and all the lagging rectified voltage waves, and means for deriving an output voltage wave corresponding to the difference between the leading and lagging combined rectified voltage waves.

5. An electric frequency discriminator circuit comprising four principal terminals, and two output terminals connected by a resistance having a central tap, eight equal resistances connected respectively in series with eight rectifiers between each principal terminal and each output terminal, eight equal condensers each of which connects one of the principal terminals with the junction point of the resistance and rectifier associated with an adjacent principal terminal, four further equal resistances connecting the four principal terminals respectively to the central tap, a phase splitting network having four phases each of which is connected in series with a corresponding further rectifier and load resistance to a common signal input circuit, a connection from each principal terminal to the junction point of the corresponding further rectifier and load resistance, and two sources of carrier waves having the same mean frequency connected respectively to the input terminals of the phase splitting network and to the signal input circuit, at least one of the said carrier waves being frequency of phase modulated.

6. A discriminator circuit according to claim 5 in which one source of carrier waves comprises a delay network to which the modulated carrier wave is applied.

CHARLES WILLIAM EARP.

REFERENCES CITED

The following references are of record in the file of this patent:

UNITED STATES PATENTS

| Number | Name | Date |
|---|---|---|
| 2,255,378 | Colchester | Sept. 9, 1941 |
| 2,280,545 | Schock | Apr. 21, 1942 |